H. SELLMANN, W. MARTIN & A. BALKAM.
Process for Preserving Fish.

No. 223,682. Patented Jan. 20, 1880.

UNITED STATES PATENT OFFICE.

HENRY SELLMANN, OF HOBOKEN, NEW JERSEY, AND WILLIAM MARTIN AND ALLAN BALKAM, OF EASTPORT, MAINE.

PROCESS FOR PRESERVING FISH.

SPECIFICATION forming part of Letters Patent No. 223,682, dated January 20, 1880.

Application filed November 7, 1879.

*To all whom it may concern:*

Be it known that we, HENRY SELLMANN, of Hoboken, county of Hudson, and State of New Jersey, and WILLIAM MARTIN and ALLAN BALKAM, of Eastport, in the county of Washington and State of Maine, have invented certain new and useful Improvements in Processes for Preserving Fish; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

Our invention relates to an improved method of preparing fish for preserving in oil, mustard, sauces, spices, or vinegar; and it consists in subjecting the same to the process of steaming and baking, in a manner to be hereinafter more fully set forth.

Figure 1:
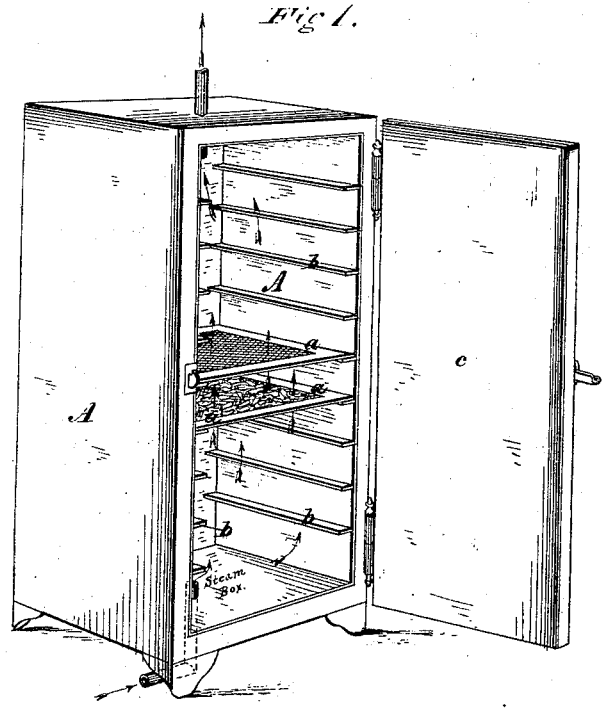
Figure 2:
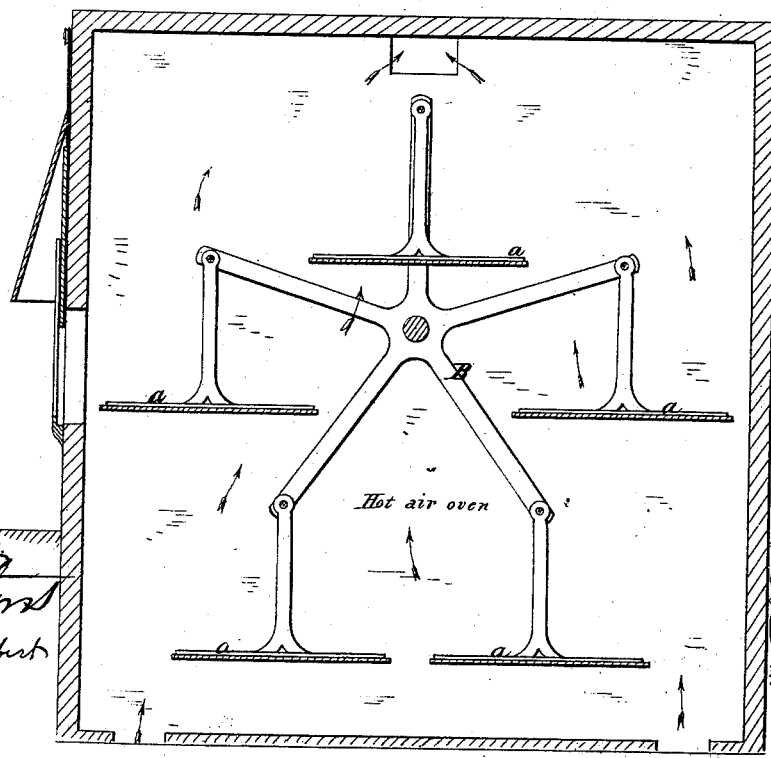

In the drawings, Figure 1 is a perspective of a wardrobe-shaped steam-box, and Fig. 2 is a transverse section of a common reel-oven.

The method heretofore in use of preparing fish for the purposes indicated is as follows: After the fish are landed they are subjected to the process of decapitation and disentrailment and salting for a suitable period. They are then washed clean and placed in shallow baskets to drain, after which they are separately spread on lath or other suitable frames for drying to a certain extent. After the fish have been sufficiently dried by exposure to the atmosphere or to an artificial current of warm dry air they are placed in shallow wire baskets, or any other suitable receptacle, and immersed in oil suitable in quality and heated to a certain degree for the purpose of frying and expelling from the fish any parts of water which remain in them after the drying process. They are then allowed to drain, and are packed in tin cans. This mode of drying by natural or artificial currents of air and frying the fish in oil is, for reasons hereinafter stated, very deleterious to the quality of the article of fish to be put up, and the invention herein set forth tends to do away with and overcome the former objectionable method. The fish used for the purpose indicated are of a very tender and delicate nature. They do not admit of much handling, and, owing to this delicacy of nature, are subject to very rapid decomposition, as they should be salted but very slightly.

The process of drying the fish, either in open air or by an artificial current of warm dry air, takes so much time that a decomposition of the fish to a greater or less extent is unavoidable, as three to twenty-four hours are consumed in drying the fish sufficiently by the modes indicated.

In frying the fish in oil, as now practiced, the quality of the oil in which quantities of fish are fried is rapidly deteriorated by the water from the fish, which is not evaporated, and from the gluten from the fish passing into it. A large percentage of the fish is also lost by breaking during the process of frying in oil.

In our improved process the fish, after landing, are decapitated, disentrailed, salted, and washed. They are then spread on wire-netting or other frames, *a*, made of any suitable metal and of any suitable size. They are then subjected to a process of steaming by live steam, which is injected from a steam-boiler into an upright chamber, A, Fig. 1, of suitable size, lined with sheet metal, and provided with narrow internal flanges or shelves *b*, upon which rest the wire frames which hold the fish. The steam passes through the closed box and escapes through an opening in the side or end opposite to where it is introduced. A door, *c*, opening outward, is also provided, for obvious reasons.

The time consumed in this process is from ten to twenty minutes, according to the power of the steam employed, and may be performed within two hours after the fish are first landed. This steaming process has the effect of evaporating the water from the fish in a much more thorough manner than by the old process. It has also the effect to prepare the fish for the subsequent baking process, and by killing any germs in them preventing rapid decomposition, keeping them sweet, and retaining their natural flavor. After the steaming process the fish (which remain on the same frames *a* on which they were steamed) are subjected to the baking heat of a revolving reel-oven, B, operated by steam or any other power, until they are fully cooked or baked. They are then taken from the revolving reel-oven, cooled a certain time, and then packed in tin cans which are supplied with fine oil, mustard, sauces, spices, or vinegar, as desired. The cans are then soldered and subjected to the action of a bath of boiling water for a certain period, for the purpose of expelling all air from the cans by the usual process.

The essence of the whole mode of procedure consists in preserving the fish against decomposition by steaming and baking, as set forth, thus preventing breaking of the skin, curling and breaking of the body, and thus evaporating from the fish all water, and then, while in this baked condition, subjecting them to the preservative process of canning similar to that practiced with sardines, inclosing in tin cans with oil, mustard, spices, &c.

It is known that small fish have been prepared and preserved entire by gutting, placing salt inside, steaming, and afterward drying by a stove and a current of hot air; and small fish have also been steamed at the boiling-point of water, then cooled, and canned in oil. They have also been canned in vinegar and in spices.

We therefore disclaim these steps, taken separately, as not of our invention.

What we claim, and desire to secure by Letters Patent, is—

The process for preserving fish before described, which consists in first subjecting the fish to live steam to remove water, and afterward baking by a dry heat, to further dry and to cook the same, and, finally, canning the same in oil, mustard, vinegar, and spices in hermetically-sealed cans.

In testimony that we claim the foregoing we have hereunto set our hands this 31st day of October, 1879.

HENRY SELLMANN.
WILLIAM MARTIN.
ALLAN BALKAM.

Witnesses:
S. D. LEAVITT,
B. B. LEAVITT.